March 11, 1947.  G. W. CORNELIUS  2,417,189
TAILLESS AIRPLANE
Filed July 27, 1942  4 Sheets-Sheet 1
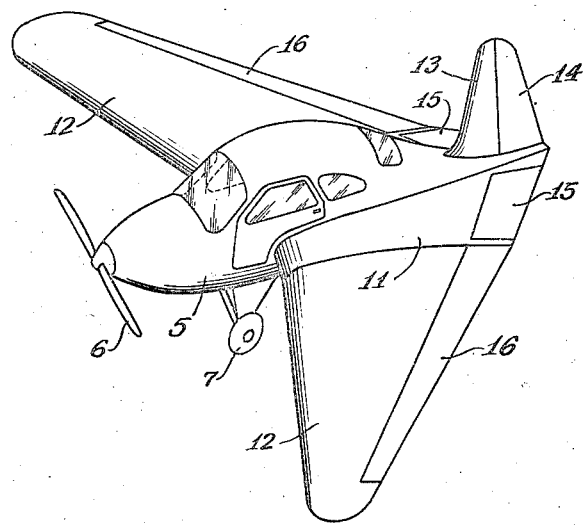
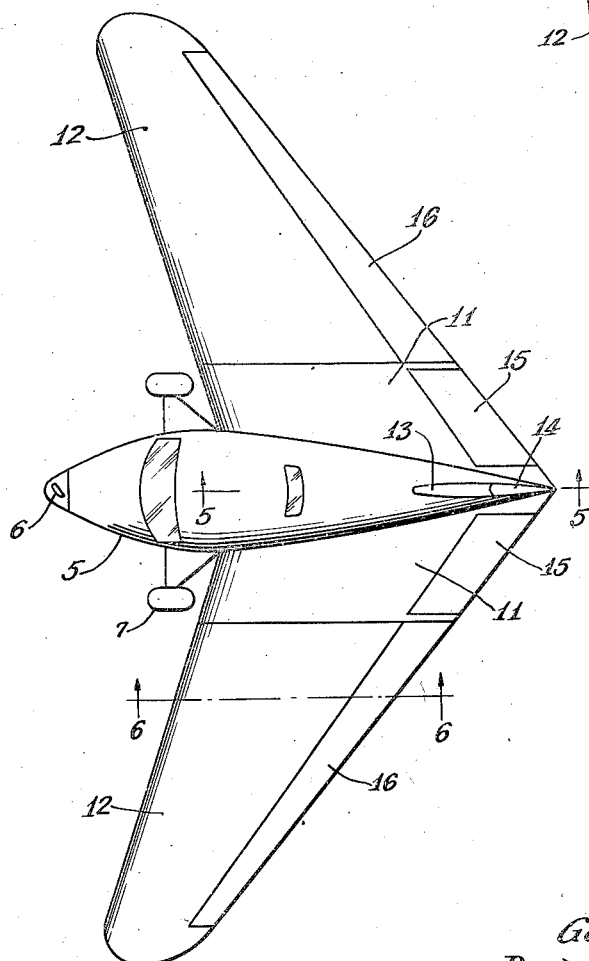
Inventor:
George W. Cornelius
By Wallace and Cannon
Attorneys March 11, 1947. G. W. CORNELIUS 2,417,189
TAILLESS AIRPLANE
Filed July 27, 1942 4 Sheets-Sheet 2

Inventor:
George W. Cornelius
By Wallace and Cannon
Attorneys

March 11, 1947.  G. W. CORNELIUS  2,417,189
TAILLESS AIRPLANE
Filed July 27, 1942  4 Sheets-Sheet 3
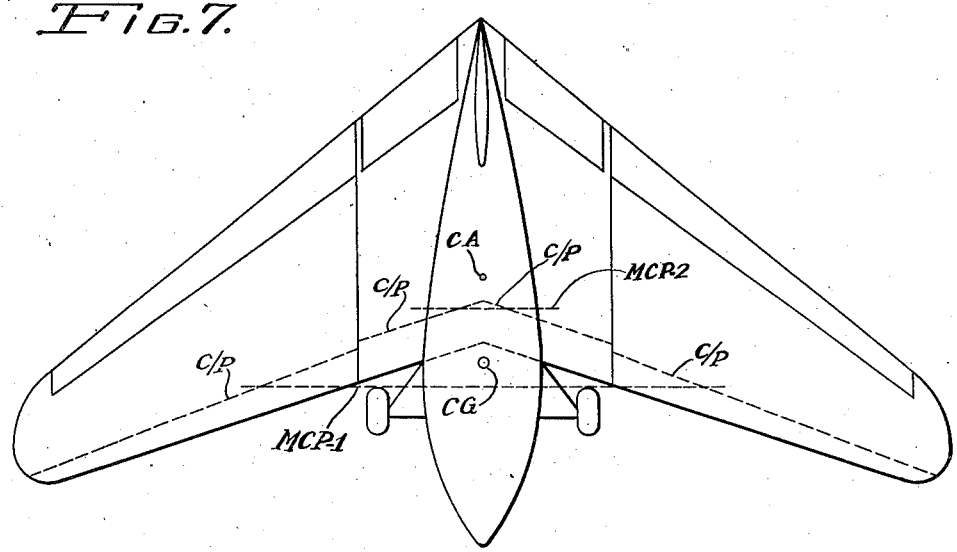
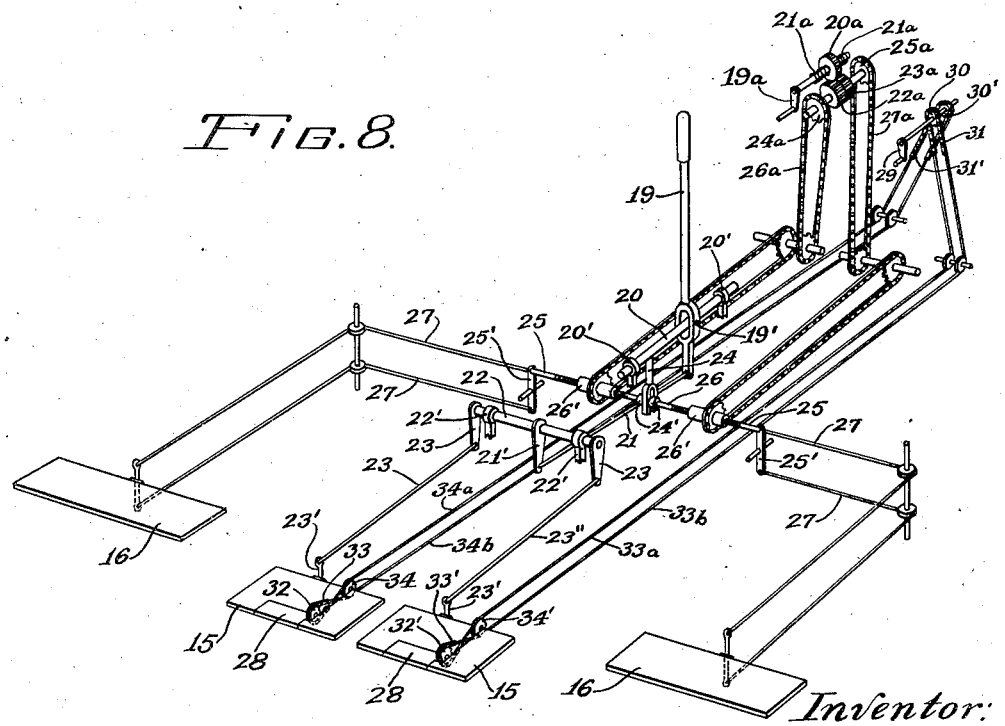

March 11, 1947.　　　G. W. CORNELIUS　　　2,417,189
TAILLESS AIRPLANE
Filed July 27, 1942　　　4 Sheets-Sheet 4

Inventor:
George W. Cornelius
By Wallace and Connor
Attorneys

Patented Mar. 11, 1947

2,417,189

UNITED STATES PATENT OFFICE 2,417,189

TAILLESS AIRPLANE

George W. Cornelius, Dayton, Ohio, assignor to The Cornelius Aircraft Corporation, Dayton, Ohio, a corporation of Ohio Application July 27, 1942, Serial No. 452,479

15 Claims. (Cl. 244—13)

This invention relates to airplanes and particularly to airplanes of the single wing or flying wing type, or in other words, to the class of airplanes in which the functions of the usual tail structure or empennage are accomplished by structure incorporated within the outlines of the main supporting airfoils.

Airplanes of the flying wing type have heretofore been proposed and constructed with the idea that airplanes of this type avoided undue aerodynamic resistance so that the efficiency of the airplanes would be improved. In such airplanes of the flying wing type it has been found that a high degree of longitudinal stability might be attained, but such stability in a longitudinal sense has, however, been attained in the prior airplanes of this type only through inefficient means which has so reduced the overall efficiency of such airplanes as to render them undesirable and unusable in a commercial sense.

An important object, therefore, of the present invention is to enable longitudinal stability to be attained in an efficient and practical manner in airplanes of the flying wing type, and an object related to the foregoing is to enable efficient airfoil sections to be utilized in attaining this end. A further and related object is to preserve such efficiency even when high-lift devices such as trailing edge wing flaps are in operation as in climbing, landing and the like.

Where efforts have been made in the past to utilize high-lift devices such as trailing edge flaps in airplanes of the flying wing type, it has been necessary to confine such flaps to a relatively small size located rearwardly of the substantial midpoint of the span of each wing, and where such small wing flaps have been utilized the added lift imparted to the wings thereby has been relatively small, and has been offset in at least a large measure through reduction of the lift coefficient of the remaining portions of the wings due to the disruption of normal air flow on these remaining portions by the side wash from the depressed control flaps. A further object of this invention is, therefore, to enable trailing edge wing flaps to be utilized along substantially the entire trailing edge of the wing structure of a flying wing type of airplane; and a further object related to the foregoing is to enable trailing edge control flaps extending from substantially the wing tips to the area occupied by the elevator flaps to be utilized not only as high lift devices but also as ailerons, and to enable these two functions to be concurrently accomplished in a simple and effective manner. Another related object is to enable a high-lift action to be attained in a flying wing type of airplane through the production of a stalling moment in substantially the entire length of the wings outwardly of the horizontal control surfaces of the airplane, and to enable such stalling moment to be attained while preserving normal and efficient airflow about the wings and the high lift devices thereof.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a perspective of a single motored flying wing type of airplane embodying the invention;

Fig. 2 is a plan view of the airplane shown in Fig. 1;

Fig. 7 is a diagrammatic plan view similar to Fig. 2;

Fig. 8 is a schematic view illustrating a control mechanism for the airplane of Figs. 1 to 4;

Figure 3:
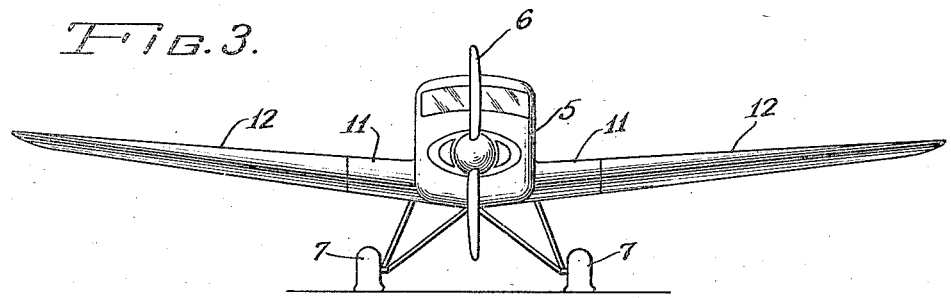
Figs. 3 and 4 are front and rear elevational views, respectively, of the airplane shown in Fig. 1.
Figure 4:
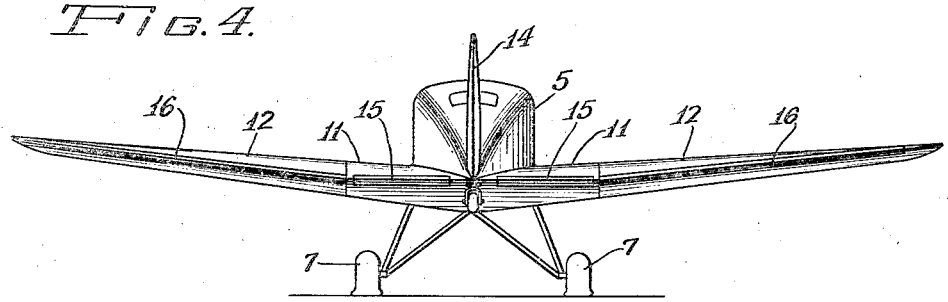

In the form of the invention chosen for disclosure in Figs. 1 to 6 of the drawings, the invention is embodied in a single motored airplane of the tailless monoplane type, having a forwardly projecting fuselage 5 disposed midway between the ends of a wing structure. The single motor (not shown) is mounted within the fuselage 5 and is arranged to drive the propeller 6 disposed at the nose of the fuselage. Landing gear, including wheels 7, are provided on the fuselage 5, and such landing gear may be of any desired type. This wing structure preferably has a substantial forward sweep, or in other words, the outer ends of the wings are disposed forwardly of the midportions thereof, and the wing structure embodies inboard or trailing wing panels 11 which, with the fuselage 5, constitute a central structure, and outboard or leading wing panels 12 are connected rigidly to and extend outwardly from said inboard wing panels 11. The wing structure thus afforded is arranged with a substantial dihedral angle, as will be evident in Figs. 3 and 4 of the drawings, for through such an arrangement the stability of the airplane is substantially increased. The inboard and outboard wing panels 11 and 12 cooperate to define a continuous wing structure of the monoplane type so that the front and rear profiles of the wing structure are both continuous from tip to tip of the wing structure, and the arrangement is such that, by reason of the forward sweep of the wing structure, directional control means such as vertical fin and rudder means may be associated therewith rearwardly of the center of gravity CG, Fig. 7, of the airplane merely through mounting of the elements thereof directly upon wing structure rather than upon a rearwardly extending and separate tail boom or other similar supporting structure. In this respect, however, resort may be had to any desired directional control means since the specific nature thereof is not a part of the present invention. However, the embodiment of the invention illustrated in Figs. 1 to 6 of the drawings includes a single vertical fin 13 and an associated rudder 14, the vertical fin 13 and the rudder 14 being disposed immediately rearwardly of the fuselage 5 and on the longitudinal center line of the airplane and the rudder 14 is governed by well understood conventional means (not shown). The wing structure is also provided with elevator means operatively associated therewith, and in the form illustrated herein this elevator means comprises a pair of trailing edge elevator flaps 15 mounted on the rear edges of the inboard wing panels 11 and on opposite sides of the vertical fin 13 and rudder 14.

Where the present invention is employed with wing structure having a substantial forward sweep, it is possible to employ trailing edge flaps 16 along substantially the entire length of the rear edges of the outboard wing panel 12, and these flaps 16 may thereby serve not only as ailerons but also, by reason of their great extent along the wings, may serve as high lift devices to facilitate take off, climbing and landing.

In accordance with the present invention the outboard or leading wing panels 12 of wing structure are disposed so that their mean center of lift is disposed substantially forwardly of the center of gravity of the airplane at all times, and the mean center of lift of the inboard or trailing wing panels is disposed substantially rearwardly of this center of gravity at all times, and the two pairs of wing panels are so constructed and related to each other and to the center of gravity of the airplane that as the airplane varies from normal level flight, or from any trimmed attitude of flight, the lifting action of the two pairs of wing panels is varied in such a way as to tend to restore the airplane to its normal level flight attitude or other trimmed attitude. This end is attained under the present invention in such a manner that the wing panels function with relatively high efficiency at all normal flight attitudes and as a result the airplane as a whole is capable of effective use in a commercial sense.

Thus as shown in Fig. 7 of the drawings the mean center of lift of the leading wing panels 12 is disposed substantially along the line MCP—1 while the mean center of lift of the trailing wing panels 11 is disposed at substantially the position shown by the line MCP—2, these locations being indicated for a normal level flying attitude of the airplane. Hence it is the lifting action of the leading wing panels 12 which imparts or tends to impart stalling moment to the airplane, and it is the lifting action exerted by the trailing panels 11 which imparts or tends to impart pitching moment to the airplane, and the areas of the leading and trailing wing panels, their dynamic characteristics, and the length of their effective moment arms are so related that in normal level flight the stalling and pitching moments are equal and opposite. When the airplane varies either upwardly or downwardly from such level flight, this relation of stalling and pitching moments is changed in such a manner as to tend to restore the airplane to its normal level flight attitude, and in accordance with the present invention this is accomplished in such a manner that the wing panels 11 and 12 operate with high efficiency at all times. This end is attained by the provision of different but well defined and well understood airfoil characteristics in the two pairs of wing panels 11 and 12 so that the pairs of wing panels will not only operate efficiently but will at all times apply their lifting forces in such a relation to the center of gravity and in such amounts as to impart the desired levelling or restoring action to the airplane. In accomplishing this result the leading panels 12 are so formed and related to the form of the trailing panels 11 that the leading panels 12 tend to stall before the trailing panels. This end may be attained in different ways, as for example, by using the same airfoil section in both the leading and trailing panels and setting the leading panels at a slightly greater angle of incidence than the trailing wing panels. Another manner of attaining such a relationship of the stalling characteristics of the two pairs of wing panels is by using the same angle of incidence for both pairs of wing panels and employing different airfoil sections in the two pairs; and a combination of these two modes of procedure may of course be employed. However, I prefer to employ an unstable or substantially unstable airfoil section in the leading panels 12 and to modify this same airfoil section to produce stable characteristics therein for use in the trailing panels 11.

Figure 5:
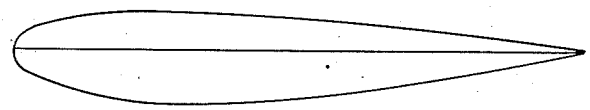
Fig. 5 is a view diagrammatically illustrating an airfoil section which may be utilized in producing certain portions of the wing structure, this view being such as to show the airfoil section as it would appear at the line 5—5 in Fig. 2 in the event that a fuselage were not employed.
Figure 6:
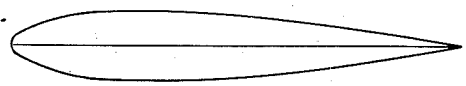
Fig. 6 is a diagrammatic illustration showing an airfoil section which may be used in the outboard wing panels of the airplane of this invention, the view being taken substantially along the line 6—6 in Fig. 2.

Thus in Fig. 6 I have illustrated an unstable airfoil section, which may be of the form identified as the NACA airfoil section No. .0012, and described in Report No. 669 published in 1939 by the National Advisory Committee for Aeronautics, and which may be used for the leading panels 12, while in Fig. 5 I have illustrated a modification of this air foil section whereby stable characteristics are attained which render it suitable for use in the trailing wing panels 11. A comparison of Fig. 5 and Fig. 6 will show that in producing the stable airfoil of Fig. 5, the upper and lower cambers have been modified, as compared with the unstable airfoil of Fig. 6, by increasing the lower ordinants and by decreasing the upper ordinants along the various stations of the upper and lower cambers. It will be observed, however, in Fig. 4, that the airfoil section of Fig. 6 is employed at the stub or outer ends of the inboard panels 11 and is modified progressively to approach the airfoil section of Fig. 5 which is attained at the longitudinal center line of the wing structure. Thus while the airfoil section of the wing panels 11 is varied as above described, it should be observed that the unstable airfoil section of Fig. 6 is employed throughout the entire length of the outer or leading wing panels 12. The leading panels 12 are set at an angle of incidence, determined by usual considerations known in the art, in accordance with the speed, wing loading and altitude for which the airplane is primarily intended, to thereby attain optimum lift-drag relations and other performance characteristics for the leading wing panels; and the inboard or trailing wing panels 11 are set at a less angle of incidence such that the lift created by the trailing wing panels will act during normal level flight through the moment arm which is then effective to support its proportionate share of the weight of the plane and thereby overcome the opposite moment induced by the leading wing panels 12 about the center of gravity of the airplane, whereby a state of equilibrium is effected during level flight.

Thus, in the airplane of this invention, in contradistinction to airplanes of the flying wing type as heretofore proposed, unstable and stable airfoil sections are employed respectively in the leading and trailing wing panels, and these airfoil sections are constructed and arranged to afford different centers of lift which are so related to the center of gravity of the airplane that the cooperative action of such airfoil sections imparts opposed stalling and pitching moments respectively to the airplane. This results in unusual efficiency in normal level flight and insures that proper and effective recovery moments will be induced when the airplane deviates from a desired level flight course.

Hence, with the foregoing arrangement, when the airplane deviates from its level flight condition and is displaced toward either a climbing or diving attitude by causes other than control, the forces exerted selectively by the leading and trailing wing panels cause the airplane to return to a state of equilibrium in level flight. Thus, when the airplane assumes a climbing attitude, the angle of attack of both the leading and trailing wing panels is increased and while the lift of both pairs of panels is accordingly increased, and by reason of the stable characteristics of the trailing wing panels, such increase in lift is accompanied by rearward shifting of the center of pressure of these trailing wing panels, to thereby increase the moment arm at which the lift of the trailing panels is applied, while at the same time, the unstable character of the leading wing panels causes this increase in lift to be accompanied by a substantially unchanged positioning of the center of lift of the leading panels. Hence, the forward pitching moment produced by the trailing wing panels overcomes the reverse or opposite turning moment or stalling moment produced by the leading wing panels, and as a result the airplane is returned to its normal condition of equilibrium in level flight.

The foregoing characteristics of the airplane of this invention are of particular merit where the angle of attack approaches the stall angle, for at this time the center of pressure of the leading wing panels moves slightly rearwardly, and simultaneously with the attainment of the stall angle of the leading wing panels, the unstable characteristics of the leading wing panels cause the center of pressure or lift thereof to move abruptly rearwardly toward the center of gravity of the airplane, foreshortening the moment arm of the forward wing panels, and at the same time the trailing panels are approaching their maximum lift with a rearward movement of the center of lift, thereby producing a powerful turning about the center of gravity through the thus extended moment arm of the trailing wing panels, thereby producing a powerful recovery moment.

As the airplane has stalled and has been pitched forwardly by the recovery moment as aforesaid, its previous speed has of course been lost, but as it starts in a downward direction in a gliding or diving attitude its speed is recovered, and since the angle of attack of the trailing wing panels has been reduced to a low or even negative value, the load is thrown entirely upon the leading wing panels so that these leading wing panels exerts a further recovery moment in an opposite direction to bring the airplane out of its dive or glide and restore the same to its condition of equilibrium in level glide or flight depending whether the power is off or on. It will be recognized that where the airplane is flying at power-on conditions, there will ordinarily be but a slight nosing down of the plane as it recovers from a stall condition as just described, for with the airplane of the present invention a total stall is never reached and hence the airplane in every instance has at least some flying speed at the time when the corrective pitching moment is applied to bring the airplane out of an impending stall.

In the event that conditions other than control cause the airplane to nose down into a glide or dive, the airplane is thrown out of its normal state of longitudinal equilibrium, and the lift on the leading panels at this attitude is of greater relative magnitude due to the combination of the forward shifting the center of pressure of the trailing panels and the resulting foreshortening of their effective moment arm and its reduced angle of the incidence, and hence the airplane is returned to state of equilibrium in level flight.

In accordance with the present invention, stability in a flying wing type of airplane is realized by so forming and relating the wing surfaces to the longitudinal center of gravity of the airplane that the mean center of area CA of the effective lifting surfaces is located a substantial distance rearwardly of such longitudinal center of gravity CG and the mean areodynamic center of the wing structure is arranged to be coincidental with this longitudinal center of gravity. By such an arrangement stability is obtained about the rolling, yawing and pitching axes of the airplane.

In the airplane which is thus provided the center of pressure of the leading supporting panels is located a substantial distance forwardly of the center of gravity of the airplane as shown in Fig. 7, and the invention therefore enables trailing edge wing flaps such as the flaps 15 and 16 to be employed along substantially the entire length of the trailing edge of the wings of the airplane. Hence the invention enables the trailing edge wing flaps to be utilized to produce improved performance characteristics in the airplane. The flaps 16 may of course function as ailerons for producing rolling moments in the airplane, and, in addition, may be used to produce stalling or pitching moments even while accomplishing their functions as ailerons.

Such control of the elevators 15 and the control flaps 16 may be attained in different ways, as for example, by the control system illustrated diagrammatically in Fig. 8 of the drawings. Since the flaps 16 extend throughout substantially the entire length of the leading wing panels 12, the lowering of such flaps 16 to act as high lift devices cannot produce side wash that would disrupt normal air flow and cause reduction in lift in any particular section of such leading wing panels, and hence the high lift action or effect of the flaps 16 is substantially uniform throughout the length of such leading wing panels and the lift distribution is substantially uniform throughout the length of the outboard panels. As there shown a control stick 19 is pivoted at 19' on a shaft 20 which is in turn supported for rocking movement in stationary bearings 20', and hence the control stick 19 may be rocked about the axis of the shaft 20 from a normal midposition to attain control of the airplane about its rolling axis, or the control stick 19 may be rocked from front to rear about the mounting 19' to attain control of the airplane about its pitching axis.

Thus, a link 21 extends from the lower end of the stick 19 to arm 21' that depends from a shaft 22 mounted in bearings 22'. Arms 23 depend from the shaft 22 and links 23'' extend to upstanding arms 23' on the elevators 15. Therefore, when the stick 19 is rocked about the mounting 19', the elevators 15 may be raised or lowered as desired for well understood purposes.

Moreover, a yoke 24 depends from the shaft 20 and is disposed between a pair of collars 24' fast on a shaft 26 in spaced apart relation. The threaded free ends of the shaft 26 are passed into turnbuckles 26' which also have the threaded ends of shafts 25 passed thereinto. The shafts 25 are respectively connected to corresponding ends of rockers 25' so that when the control stick 19 is rocked about the axis of the shaft 20, this is effective through the yoke 24, shafts 26, turnbuckles 26' and shafts 25 to rock the rockers 25' in unison. Cables 27 extend between the ends of the rockers 25' and arms on the control flaps 16 and therefore when the rockers 25' are moved, the flaps 16 are manipulated in the conventional manner.

In the airplane of the present invention, the control flaps 16 may also serve as high lift devices. Hence, a crank 19a is provided which has a gear 20a thereon that is maintained in a centered position by springs 21a relative to gears 22a and 23a which are independently and respectively connected to sprockets 24a and 25a. A chain 26a leads from the sprockets 24a to one of the turnbuckles 26' and another chain 27a leads to the other of the turnbuckles 26' from the sprocket 25a. When the gear 20a is centered relative to the gears 22a and 23a and the crank 19a is operated, the turnbuckles 26' are simultaneously rotated and this is effective through the threaded ends of the shafts 25 to move the rockers 25' and thereby adjust the flaps 16 as desired. If, however, the gear 20a is moved from centered position to be meshed with only one or the other of the gears 22a and 23a, then but one of the flaps 16 will be adjusted upon rotation of the crank 19a, whereby independent adjustment of the control flaps may be effected. For example, the control crank may be actuated to produce equal lengthening of the turnbuckles to thereby cause lowering of the control flaps 16. A high lift action or stalling moment is thereby produced by the simultaneous lowering of the two control flaps 16, and yet, during the time when the two flaps 16 are thus equally lowered, the control stick 19 may be rocked from side to side to actuate the lowered control flaps 16 as ailerons.

If it should be desired that longitudinal trimming be effected, tabs 28, Fig. 8, may be provided in the elevators 15 and a crank 29 may then be arranged to enable manipulation of such tabs. For example, sprockets 30 and 30' may be provided on the crank 29 and relatively short chains 31 and 31' may be passed thereabout. Sprockets 32 and 32' may then be operatively associated with the tabs 28 and relatively short chains 33 and 33' may be passed about these sprockets. Pulleys 34 and 34', centered relative to the mounting of the elevators 15, are juxtaposed to the sprockets 32 and 32', this arrangement enabling adjustment of the elevators without effect upon the adjustment of the tabs. Cables 34a and 34b interconnect the free ends of the chains 33 and 31' while cables 33a and 33b interconnect the free ends of the chains 33' and 31 so that upon rotation of the crank 29, the tabs 28 may be adjusted to afford the desired longitudinal trim.

Figure 9:
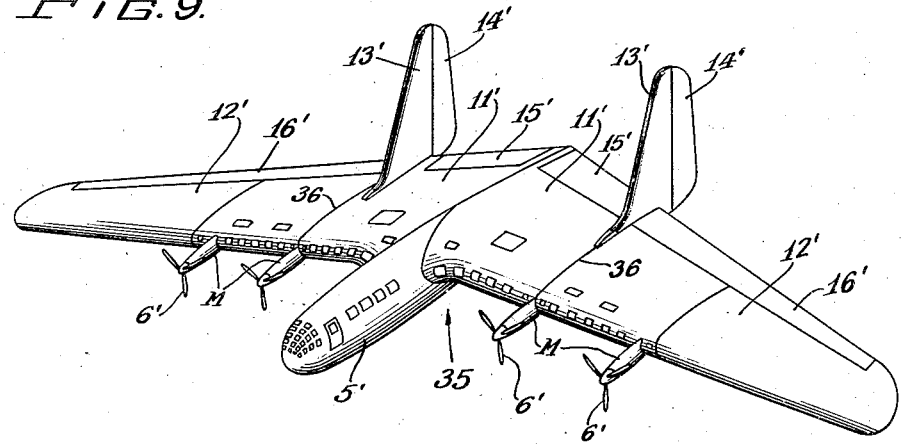
Fig. 9 is a perspective view illustrating the invention as embodied in a relatively large airplane.

The present invention may also be incorporated in airplanes of a relatively large size such, for example, as the embodiment of the invention illustrated in Fig. 9 of the drawings. This airplane 35 is of the flying wing type and embodies a fuselage 5' having the wing structure projecting therefrom in opposite directions. This wing structure has inboard or trailing wing panels 11' and outboard or leading wing panels 12', the panels 12' extending from the tips of the wings inwardly to the lines 36 on the present instance. In this embodiment of the invention the ordinants of the wings are such throughout a substantial portion of the span of the wings that they may serve to provide cargo or passenger carrying space within or between the upper and lower cambers of these portions of the wings, and the fuselage 5' is of a correspondingly large size.

In the embodiment of the invention shown in Fig. 9 of the drawing the forward sweep angle and the dihedral angle of the wing structure have been reduced considerably as compared with the forward sweep angle and the dihedral angle employed in the embodiment of the invention shown in Figs. 1 to 6, but the area of the leading wing panels and the outward extent thereof are such that the mean center of pressure of the leading wing panels is disposed substantially forwardly of the center of gravity of the airplane in accordance with the fundamental principles set forth hereinabove in connection with the description of Figs. 1 to 7 of the drawing. The airplane shown in Fig. 9 is of the multi-motored type, there being four such motors M disposed in spaced relation along the forward profiles of the wing structure so that propellers 6' driven thereby are disposed forwardly of the leading edge of the wings.

The outer or leading wing panels 12' are provided with trailing edge wing flaps 16' which extend throughout substantially the entire length of the trailing edges of the leading wing panels 12' so as to function in the same manner as the wing flaps 16, and elevator flaps 15' are disposed as trailing edge flaps on the inboard or trailing panels 11' in substantially the same manner and in substantially the same relation as in the embodiment of the invention disclosed in Figs. 1 to 7. The embodiment of the invention shown in Fig. 9 is, however, provided with a vertical fin 13' and an associated rudder 14' on each side of the center line of the airplane, these vertical fin and rudder structures being disposed in the present instance substantially at the lines 36 which define the adjacent ends of the wing panels 11' and 12' on opposite sides of the longitudinal center line of the airplane 35. The rudders 14' may be governed by conventional means well understood in the art and such means therefore will not be illustrated or described; and the elevator flaps 15' and the control flaps 16' may be operated by the means and in the manner described in connection with the other embodiment of the invention. Moreover, if desired, resort may be had to other directional control means.

Figure 10:
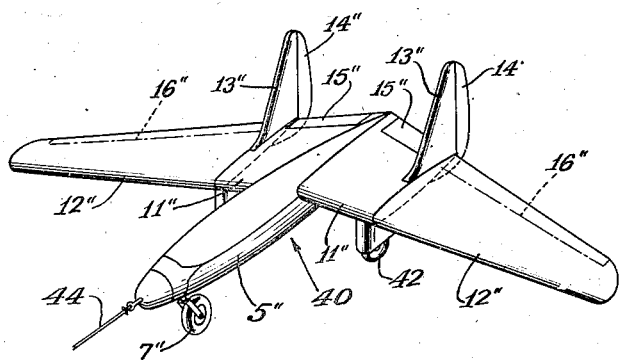
Fig. 10 is a perspective view illustrating the invention as embodied in a motorless airplane or glider.

The present invention may also be embodied in motorless airplanes or gliders, and one such embodiment is illustrated in Fig. 10 of the drawings. The glider 40 of this embodiment of the invention has a wing structure which embodies inner or trailing wing panels 11" from the outer ends of which outboard or leading wing panels 12 are extended, and the forward sweep and the dihedral angle in the wing structure thus provided are substantially the same as those employed in the embodiment of the invention shown in Fig. 9. The glider 40 has a fuselage 5" which projects forwardly therefrom and the arrangement is such that the center of gravity is disposed forwardly of the mean center of pressure of the inboard or trailing wing panels 11" and is disposed substantially rearwardly of the mean center of pressure of the outboard or leading wing panels 12". The design and relationship of the inner and outer wing panels 11" and 12" with respect to each other and with respect to the mean aerodynamic center of the airplane are substantially the same as heretobefore described with relation to the embodiment of the invention shown in Figs. 1 to 7. The glider 40 is also provided with a vertical fin 13" and a rudder 14" on located opposite sides of the center line of the glider in substantially the same manner as in the embodiment of the invention shown in Fig. 9 and the rudder 14" may be controlled by conventional means. The vertical fins 13" and the rudders 14" may be supplanted by other directional control means, if desired. A tricycle type of landing gear is advantageously employed on the glides 40 and, as shown, includes spaced and aligned wheels as 42 suitably supported beneath and from the wing structure and a landing wheel 7" supported beneath and from the nose of the fuselage 5". The glider 40 is adapted to be towed by means such as a cable 44, and where the glider is to be controlled by a pilot riding in the glider, or by remote control means, the glider is provided with wing flaps 16" along substantially the entire length of the trailing of the outboard or leading wing panels 12" and is provided with elevator flaps 15" along the trailing edges of the wing panels 11", the flaps 15" and 16" being actuated by means such as that shown in Fig. 8. In the drawings the flaps 16" are indicated in dotted outline, since these flaps may not be used in some instances. Provision would also be made in such an instance for actuation of the rudders 14" by the pilot or the remote control means.

In many instances it is desirable to operate the glider without a pilot or without a remote control means, and the glider provided by the present invention is particularly adapted for such use by reason of the inherent characteristics of stability which are imparted thereto in the manner described hereinabove with reference more particularly to Figs. 1 to 7. In such an instance the rudders 14" are fixed in a stationary relationship wherein they merely form continuations of the vertical fins 13" or other directional control means are employed. The trailing edge wing flaps 16" would also in such an instance be eliminated, but it should be noted that the elevator flaps 15" would be retained so that they may serve as trim means or trim tabs which may be set in accordance with the loading and the desired flying characteristics.

While in those instances where gliders have been towed heretofore, it has been customary to attach the tow line to the glider in such a manner that the point of connection was disposed below the vertical center of gravity, I have found that the point of connection of the tow line to the glider should be such that, at cruising speeds, the thrust moment balances out the drag moment of the glider to thereby establish a zero pitching moment about the center of gravity. Thus, for example, in so far as the glider shown in Fig. 10 is concerned, the point of connection of the tow line to the glider is above the center of gravity in order that the foregoing desideration may be realized. This overcomes the normal tendency of the glider to rise as the speed thereof increases and results in the glider flying in substantially the flight path of the airplane towing the same.

From the foregoing description it will be apparent that the present invention enables stability to be attained in the flying wing type of airplane in an efficient manner such that the overall efficiency of airplanes of this type may be increased sufficiently to render such planes commercially practical. Moreover, the airplane of the present invention is such that high lift devices may be associated therewith in such a manner that the efficiency of the wings is not reduced when such high lift devices are thrown into operation. The present invention enables training edge wing flaps to be used along substantially the entire trailing edge of the wing structure so that uniformity of airflow about the airfoil sections is attained even when the trailing edge wing flaps are actuated for purposes of control; and the present invention enables relatively large trailing edge wing flaps to be utilized as ailerons or as high lift devices, and these two functions may be accompanied simultaneously by the trailing edge control flaps.

The provision of different airfoil sections in the leading and trailing wing panels of the airplane of the present invention not only enables the wing structure to operate efficiently at all times but also enables the leading and trailing wing panels to cooperate in such a manner as to avoid complete stalling or undesired diving of the airplane and insure return to a condition of equilibrium in level flight within the minimum time.

Hence, while I have illustrated and described preferred embodiments of my invention, it is to be understood that these are capable of variation and modification and I therefore do not wish to be limited to the precise details set forth, but desire to avail myself of such changes and alterations as fall within the purview of the following claims.

I claim:

1. In an airplane, a wing structure embodying a pair of inboard wing panels constituting a central structure and a pair of outboard wing panels connected to and extending outwardly from said central structure, said inboard and outboard wing panels being connected together and cooperating to define a continuous wing structure having continuous leading and trailing edges, directional control means, trailing edge means for trimming the airplane, elevator means operatively associated with and carried by said wing structure, said wing structure being so constructed and arranged that one of said pairs of wing panels constitutes a leading pair and the other of said pairs of wing panels constitutes a trailing pair of wing panels, and said wing structure being so constructed and arranged that its center of gravity is disposed rearwardly of the mean center of lift of said leading pair of panels and is disposed forwardly of the mean center of lift of said trailing pair of wing panels, said wing panels being so constructed and arranged that in any trimmed attitude of the airplane said leading pair of wing panels and said trailing pair of wing panels exert their respective lifting forces with respect to the center of gravity in such a relation as to effect a state of longitudinal equilibrium in said airplane, said trailing pair of wing panels having an airfoil section that is so constructed and arranged that increased lift is accompanied by reward shifting of the mean center of pressure thereof as the airplane approaches its stalling angle to thereby impart a corrective pitching moment to the airplane about its center of gravity, and said leading pair of wing panels having an airfoil section that is so constructed and arranged that increased lift is accompanied by substantially unchanged positioning of the center of pressure thereof as the airplane approaches its stalling angle.

2. In an airplane, a wing structure embodying a pair of inboard wing panels constituting a central structure and a pair of outboard wing panels connected to and extending outwardly from said central structure, said inboard and outboard wing panels being connected together and cooperating to define a continuous wing structure having continuous leading and trailing edges, directional control means, trailing edge means for trimming the airplane, elevator means operatively associated with and carried by said wing structure, said wing structure being so constructed and arranged that one of said pairs of wing panels constitutes the leading pair of panels and has its mean center of lift disposed forwardly of the center of gravity of the airplane and so that the other pair of wing panels constitutes the trailing pair of wing panels and has its mean center of lift disposed rearwardly of said center of gravity, said wing panels being so constructed and arranged that in any trimmed attitude said leading pair of wing panels and said trailing pair of wing panels exert their respective lifting forces with respect to the center of gravity in such a relation as to effect a state of longitudinal equilibrium in said airplane, said trailing pair of wing panels having an airfoil section constructed and arranged so that increased lift is accompanied by rearward shifting of the mean center of pressure thereof as the airplane approaches its stalling angle to thereby impart a corrective pitching moment to the airplane about its center of gravity, and said leading pair of wing panels having an airfoil section so constructed and arranged that increased lift is accompanied by substantially unchanged positioning of the center of pressure thereof as the airplane approaches its stalling angle and then shifts the center of pressure thereof abruptly rearwardly when the stalling angle of the leading wing panels is substantially reached to thereby render the pitching moment, induced as aforesaid, increasingly effective to return the airplane to its normal level flight condition.

3. In an airplane, a wing structure embodying a pair of inboard wing panels constituting a central structure and a pair of outboard wing panels connected to and extending outwardly from said central structure, trailing edge means for trimming the airplane, said inboard and outboard wing panels being connected together and cooperating to define a continuous wing structure having continuous leading and trailing edges, directional control means, said wing structure being so constructed and arranged that one of said pairs of wing panels constitutes the leading pair of panels and has its mean center of lift disposed forwardly of the center of gravity of the airplane and so that the other pair of wing panels constitutes the trailing pair of wing panels and has its mean center of lift disposed rearwardly of the center of gravity of the airplane, said wing panels being so constructed and arranged that in any trimmed attitude of flight said leading pair of wing panels and said trailing pair of wing panels exert their respective lifting forces with respect to the center of gravity in such a relation as to effect a state of longitudinal equilibrium in said airplane, said trailing pair of wing panels having an airfoil section so constructed and arranged that increased lift is accompanied by rearward shifting of the mean center of pressure thereof as the airplane approaches its stalling angle to thereby induce a corrective pitching moment in the airplane about the center of gravity of the airplane, said leading pair of wing panels having an airfoil section so constructed and arranged that increased lift is accompanied by abrupt rearward shifting of the main center of pressure thereof when the stalling angle of the leading wing panels is substantially reached to thereby abruptly increase the effectiveness of the pitching moment induced as aforesaid by said trailing wing panels.

4 In an airplane of the flying wing type, a wing structure consisting of a pair of inboard wing panels constituting a central structure and a pair of outboard wing panels connected to and extending outwardly from said central structure, said inboard and outboard wing panels being connected together and cooperating to define a continuous wing structure having continuous leading and trailing edges, directional control means, trailing edge elevator flaps extending along substantially the entire length of said inboard panels, and trailing edge control flaps extending along substantially the entire length of said outward panels, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of the airplane said leading pair of wing panels and said trailing pair of wing panels exert their respective lifting forces with respect to the center of gravity in such a relation as to effect a state of longitudinal equilibrium in said airplane, and said trailing pair of wing panels having an airfoil section so constructed and arranged that an increase in lift is accompanied by rearward shifting of the means center of pressure thereof as the airplane approaches its stalling angle to thereby impart a corrective pitching moment to the airplane, said forward sweep being such that movement of said control flaps to their extreme depending positions produces a substantially uniform lift distribution throughout the length of said outboard panels.

5. In an airplane of the flying wing type, a wing structure consisting of a pair of inboard wing panels constituting a central structure and a pair of outboard wing panels connected to and extending outwardly from said central structure, said inboard and outboard wing panels being connected together and cooperating to define a continuous wing structure having continuous leading and trailing edges, directional control means, trailing edge elevator flaps extending along substantially the entire length of said inboard panels, and trailing edge control flaps extending along substantially the entire length of said outboard panels, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of flight said leading pair of wing panels and said trailing pair of wing panels exert their respective lifting forces with respect to the center of gravity in such a relation as to effect a state of longitudinal equilibrium in said airplane, and said trailing pair of wing panels being constructed and arranged with an airfoil section such that an increase in lift is accompanied by rearward shifting of the mean center of pressure thereof as the airplane approaches its stalling angle, said forward sweep being such that movement of said control flaps to their extreme depending positions produces a substantially uniform lift distribution throughout the length of said outboard panels, and said outboard wing panels being constructed and arranged with an airfoil section such that an increase in lift is accompanied by a substantially unchanged positioning of the center of pressure thereof as the airplane approaches its stalling angle.

6. In an airplane of the flying wing type, a wing structure consisting of a pair of inboard wing panels constituting a central structure and a pair of outboard wing panels connected to and extending outwardly from said central structure, said inboard and outboard wing panels being connected together and cooperating to define a continuous wing structure having continuous leading and trailing edges, directional control means, trailing edge elevator flaps extending along substantially the entire length of said inboard panels, and trailing edge control flaps extending along substantially the entire length of said outboard panels, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of the airplane said leading pair of wing panels and said trailing pair of wing panels exert their respective lifting forces with respect to the center of gravity in such a relation as to effect a state of longitudinal equilibrium in said airplane, and said trailing pair of wing panels being constructed and arranged with an airfoil section such that an increase in lift is accompanied by rearward shifting of the mean center of pressure thereof as the airplane approaches its stalling angle to thereby induce a corrective pitching moment in the airplane, and said forward sweep being such that movement of said control flaps to their extreme depending positions induces shifting of the mean center of pressure of said outboard wing panels rearwardly through a range terminating forwardly of said center of gravity of the airplane.

7. In an airplane of the flying wing type, a wing structure embodying a pair of inboard wing panels and a pair of outboard wing panels connected to and extending outwardly therefrom, directional control means, elevator flaps and control flaps operatively associated with and carried by said wing structure, said wing structure having a forward sweep such that its center of gravity is disposed rearwardly of the mean center of lift of said outboard wing panels and is disposed forwardly of the mean center of lift of the inboard wing panels, said wing panels being so constructed and arranged that in any trimmed attitude of flight said outboard wing panels and said inboard wing panels exert their respective lifting forces with respect to the center of gravity in such a relation as to effect a state of longitudinal equilibrium in said airplane, said trailing pair of wing panels having an airfoil section so constructed and arranged that an increase in lift is accompanied by rearward shifting of the main center of pressure thereof as the airplane approaches its stalling angle to thereby produce a corrective pitching moment in the airplane about the center of gravity of the airplane, said leading pair of wing panels having an airfoil section so constructed and arranged that an increase in lift is accompanied by an abrupt rearward shifting of the mean center of pressure thereof when the stalling angle of the leading wing panels is substantially reached to thereby increase the effectiveness of the aforesaid corrective pitching moment, and said forward sweep being such that movement of said control panels to their fully lowered positions induces shifting of the mean center of pressure of said outboard wing panels rearwardly through a range terminating forwardly of the center of gravity of the airplane.

8. In an airplane of the flying wing type, a wing structure consisting of a pair of inboard wing panels and a pair of outboard wing panels connected to and extending outwardly therefrom, said inboard and outboard wing panels being connected together and cooperating to define a continuous wing structure having continuous leading and trailing edges, directional control means, trailing edge elevator flaps extending along substantially the entire length of said inboard panels, and trailing edge control flaps extending along substantially the entire length of said outboard panels, said wing structure having a forward sweep such that the center of gravity of the airplane is disposed rearwardly of the mean center of lift of the outboard wing panels and is disposed forwardly of the mean center of lift of the inboard wing panels, said wing panels being so constructed and arranged that in any trimmed attitude of the airplane said outboard wing panels and said inboard wing panels exert their respective lifting forces with respect to the center of gravity in such a relation as to effect a state of longitudinal equilibrium in said airplane, and said inboard wing panels having an airfoil section so constructed and arranged that an increase in lift is accompanied by rearward shifting of the mean center of pressure thereof as the airplane approaches its stalling angle to thereby induce a corrective pitching moment in the airplane about the center of gravity of the airplane, said forward sweep being such that movement of said control flaps in unison to selected depending positions produces a substantially uniform lift distribution throughout the length of said outboard panels, a control stick operatively associated with said trailing edge elevator flaps to impart movement thereto when said control stick is moved in one direction and having actuating connections with said control flaps to actuate said control flaps as ailerons when said control stick is moved in another direction, and means operable to adjust said actuating connections to operate said control flaps as high lift means in unison in the same direction.

9. In an airplane of the flying wing type, a wing structure consisting of a pair of inboard wing panels and a pair of outboard wing panels connected to and extending outwardly therefrom, said inboard and outboard wing panels being connected together and cooperating to define a continuous wing structure having continuous leading and trailing edges, directional control means, trailing edge elevator flaps extending along substantially the entire length of said inboard panels, and trailing edge control flaps extending along substantially the entire length of said outboard panels, said wing structure having a forward sweep such that the center of gravity of the airplane is disposed rearwardly of the mean center of lift of the outboard wing panels and is disposed forwardly of the mean center of lift of the inboard wing panels, said wing panels being so constructed and arranged that in any trimmed attitude of the airplane said outboard wing panels and said inboard wing panels exert their respective lifting forces with respect to the center of gravity in such a relation as to effect a state of longitudinal equilibrium in said airplane, and said inboard wing panels having an airfoil section so constructed and arranged that an increase in lift is accompanied by substantial rearward shifting of the mean center of pressure thereof as the airplane approaches its stalling angle, said forward sweep being such that movement of said control flaps in unison to their extreme depending positions causes shifting of the mean center of lift of said outboard panels rearwardly through a range terminating forwardly of said center of gravity of said airplane and produces a substantially uniform lift distribution throughout the length of said outboard panels, a control stick operatively associated with said trailing edge elevator flaps to impart movement thereto when said control stick is moved in one direction and having actuating connections with said control flaps to actuate said control flaps as ailerons when said control stick is moved in another direction, and means operable to adjust said actuating connections to operate said control flaps in unison in the same direction.

10. In an airplane of the flying wing type, a wing structure consisting of a pair of inboard wing panels and a pair of outboard wing panels connected to and extending outwardly therefrom, directional control means, trailing edge elevator flaps extending along substantially the entire length of said inboard panels, and trailing edge control flaps extending along substantially the entire length of said outboard panels, said wing structure having a forward sweep such that said mean centers of lift of the outboard wing panels and said inboard wing panels are disposed in spaced relation forwardly and rearwardly, respectively, in relation to the center of gravity of said airplane, said wing panels being so constructed and arranged that in any trimmed attitude of the airplane said outboard pair of wing panels and said inboard pair of wing panels exert their respective lifting forces with respect to the center of gravity in such a relation as to effect a state of longitudinal equilibrium in said airplane, and said inboard pair of wing panels having an airfoil section so constructed and arranged that an increase in lift is accompanied by rearward shifting of the mean center of pressure thereof as the airplane approaches its stalling angle, said forward sweep being such that movement of said control flaps as high lift devices to their extreme depending positions produces a substantially uniform lift distribution throughout the length of said outboard panels with the center of pressure in all portions of said outboard panels disposed forwardly of the center of gravity of the airplane, control means for operating said control flaps selectively as high lift devices, as ailerons, and as ailerons while said control flaps are acting as high lift devices.

11. In an airplane of the flying wing type, a wing structure consisting of a pair of inboard wing panels and a pair of outboard wing panels connected to and extending outwardly therefrom, directional control means, trailing edge control flaps extending along substantially the entire length of said outboard panels, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of the airplane said outboard pair of wing panels exerts a greater lifting force than the lifting force exerted by said inboard pair of wing panels, and said outboard pair of wing panels and said inboard pair of wing panels exert their respective lifting forces with respect to the center of gravity in such a relation as to effect a state of longitudinal equilibrium in said airplane, and said outboard pair of wing panels being formed from a substantially unstable airfoil section so disposed as to approach a stall prior to stalling of said pair of inboard wing panels and said inboard pair of wing panels being formed from an airfoil section wherein an increase in lift is accompanied by a substantial rearward shifting of the mean center of pressure as the airplane approaches its stalling angle, said forward sweep being such that movement of said control flaps to their extreme depending positions produces a substantially uniform lift distribution throughout the length of said outboard panels, and control means for operating said trailing edge wing flaps.

12. In an airplane of the flying wing type, a wing structure consisting of a pair of inboard wing panels and a pair of outboard wing panels connected to and extending outwardly therefrom, directional control means, trailing edge control flaps extending along substantially the entire length of said outboard panels, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of the airplane said outboard pair of wing panels exerts a greater lifting force than the lifting force exerted by said inboard pair of wing panels and said outboard pair of wing panels and said inboard pair of wing panels exert their respective lifting forces with respect to the center of gravity in such a relation as to effect a state of longitudinal equilibrium in said airplane, and said outboard pair of wing panels comprising airfoil sections so formed and disposed as to approach a stall prior to stalling of said pair of inboard wing panels and said inboard pair of wing panels comprising airfoil sections wherein an increase in lift is accompanied by substantial rearward shifting of the mean center of pressure as the airplane approaches its stalling angle, said forward sweep being such that movement of said control flaps to their extreme depending positions produces a substantially uniform lift distribution throughout the length of said outboard panels with the centers of lift throughout said outboard panels disposed in every instance forwardly of the center of gravity of the airplane.

13. In an airplane of the flying wing type, a wing structure consisting of a pair of inboard wing panels and a pair of outboard wing panels connected to and extending outwardly therefrom, directional control means, trailing edge means for trimming the airplane, said wing structure having a forward sweep such that its center of gravity is disposed rearwardly of the mean center of lift of the outboard wing panels and is disposed forwardly of the mean center of lift of the inboard wing panels, said wing panels being so constructed and arranged that in any trimmed attitude of the airplane said outboard pair of wing panels exerts a greater lifting force than the lifting force exerted by said inboard pair of wing panels and said outboard pair of wing panels and said inboard pair of wing panels exert their respective lifting forces with respect to the center of gravity in such a relation as to effect a state of longitudinal equilibrium in said airplane, and said outboard pair of wing panels comprising airfoil sections so formed and disposed as to approach a stall prior to stalling of said pair of inboard wing panels and said inboard pair of wing panels comprising airfoil sections wherein increased lift is accompanied by substantial rearward shifting of the mean center of pressure as the airplane approaches its stalling angle.

14. In an airplane of the flying wing type, a wing structure consisting of a pair of inboard wing panels and a pair of outboard wing panels connected to and extending outwardly therefrom, directional control means, trailing edge elevator flaps extending along substantially the entire length of said inboard panels, and trailing edge control flaps extending along substantially the entire length of said outboard panels, said wing structure having a forward sweep such that said mean centers of lift of the outboard wing panels and said inboard wing panels are disposed in spaced relation forwardly and rearwardly, respectively, in relation to the center of gravity of said airplane, said wing panels being so constructed and arranged that in any trimmed attitude of the airplane said outboard pair of wing panels and said inboard pair of wing panels exert their respective lifting forces with respect to the center of gravity in such a relation as to effect a state of longitudinal equilibrium in said airplane, and said inboard pair of wing panels having an airfoil section so constructed and arranged that an increase in lift is accompanied by rearward shifting of the mean center of pressure thereof as the airplane approaches its stalling angle, said forward sweep being such that movement of said control flaps as high lift devices to their extreme depending positions produces a substantially uniform lift distribution throughout the entire length of said outboard panels and throughout the operative range of said control flaps, control means including a control stick for operating said control flaps as ailerons, and control means operable selectively upon said control flaps to adjust said control flaps in unison as high lift devices or to adjust said control flaps independent of each other as high lift devices.

15. In an airplane of the flying wing type, a wing structure consisting of a pair of inboard wing panels and a pair of outboard wing panels connected to and extending outwardly therefrom, directional control means, trailing edge elevator flaps extending along substantially the entire length of said inboard panels, and trailing edge control flaps extending along substantially the entire length of said outboard panels, said wing structure having a forward sweep such that said mean centers of lift of the outboard wing panels and said inboard wing panels are disposed in spaced relation forwardly and rearwardly, respectively, in relation to the center of gravity of said airplane, said wing panels being so constructed and arranged that in any trimmed attitude of flight said outboard pair of wing panels and said inboard pair of wing panels exert their respective lifting forces with respect to the center of gravity in such a relation as to effect a state of longitudinal equilibrium in said airplane, and said inboard pair of wing panels having an airfoil section so constructed and arranged that increase in lift is accompanied by rearward shifting of the mean center of pressure thereof as the airplane approaches its stalling attitude, said forward sweep being such that movement of said control flaps as high lift devices to any depending position within the operative range thereof produces a substantially uniform lift distribution throughout the entire length of said outboard panels, control means for operating said control flaps selectively as high lift devices, as ailerons, and as ailerons while said control flaps are acting as high lift devices, trim flaps mounted on the respective elevator flaps, and means operable independently of the adjustment of said elevator flaps to impart adjusting movement to said trim flaps substantially in unison.

GEORGE W. CORNELIUS.

REFERENCES CITED

The following references are of record in the file of this patent:

UNITED STATES PATENTS

| Number | Name | Date |
| --- | --- | --- |
| 1,418,783 | Fokker | June 6, 1922 |
| 1,862,102 | Stout | June 7, 1932 |
| 1,890,079 | Focke | Dec. 6, 1932 |
| 1,893,129 | Charpentier | Jan. 3, 1933 |
| 2,191,842 | Back | Feb. 27, 1940 |
| 1,780,813 | Burnelli | Nov. 4, 1930 |
| 1,843,678 | Jannin | Feb. 2, 1932 |
| 1,987,050 | Burnelli | Jan. 8, 1935 |
| 1,880,019 | Harper | Sept. 27, 1932 |
| 2,172,813 | Waterman | Sept. 12, 1939 |
| 2,124,867 | Akerman | July 26, 1938 |

FOREIGN PATENTS

| Number | Country | Date |
| --- | --- | --- |
| 196,937 | British | Apr. 30, 1923 |
| 203,654 | British | May 2, 1923 |